S. H. FLEMING & O. A. LANGOS.
MACHINE FOR APPLYING STAYS TO SOFT METAL TUBES.
APPLICATION FILED FEB. 6, 1912.

1,051,095.

Patented Jan. 21, 1913.

5 SHEETS—SHEET 1.

Witnesses:
Inventors
Stephen H. Fleming & Otto A. Langos
By Peirce, Fisher & Clapp
Att'ys.

S. H. FLEMING & O. A. LANGOS.
MACHINE FOR APPLYING STAYS TO SOFT METAL TUBES.
APPLICATION FILED FEB. 6, 1912.
1,051,095.
Patented Jan. 21, 1913.
5 SHEETS—SHEET 2.
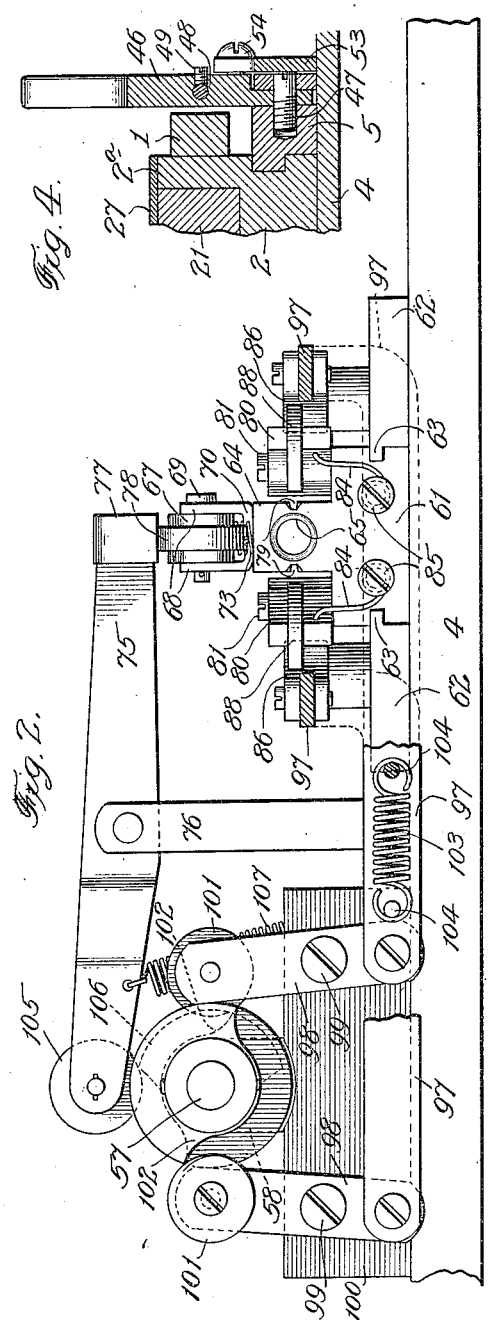
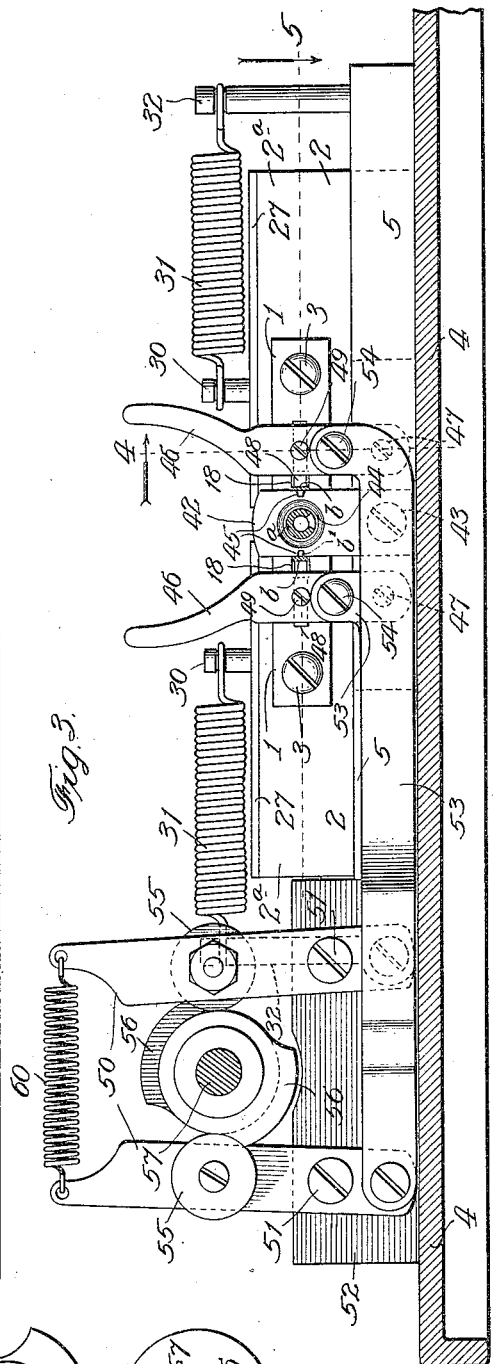
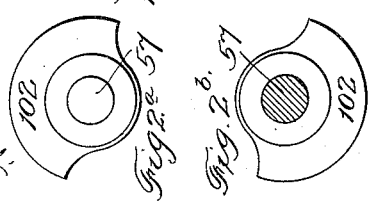

S. H. FLEMING & O. A. LANGOS.
MACHINE FOR APPLYING STAYS TO SOFT METAL TUBES.
APPLICATION FILED FEB. 6, 1912.

1,051,095.

Patented Jan. 21, 1913.

5 SHEETS—SHEET 3.

S. H. FLEMING & O. A. LANGOS.
MACHINE FOR APPLYING STAYS TO SOFT METAL TUBES.
APPLICATION FILED FEB. 6, 1912.
1,051,095.
Patented Jan. 21, 1913.
5 SHEETS—SHEET 4.
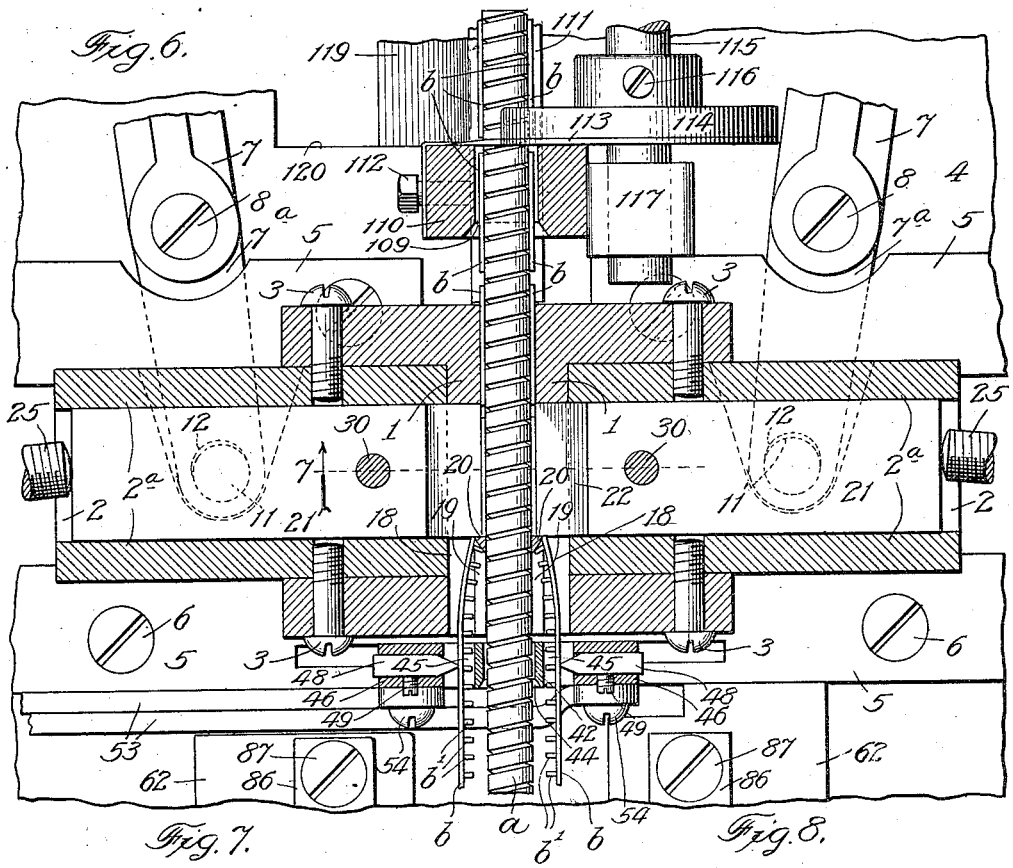
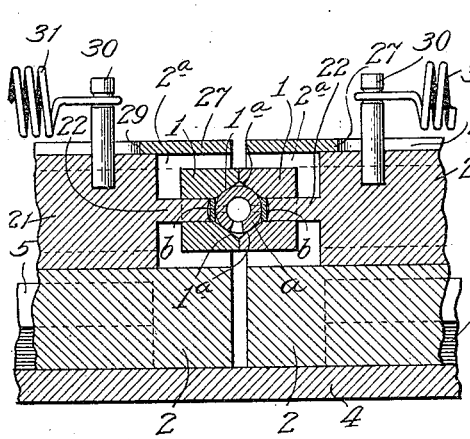
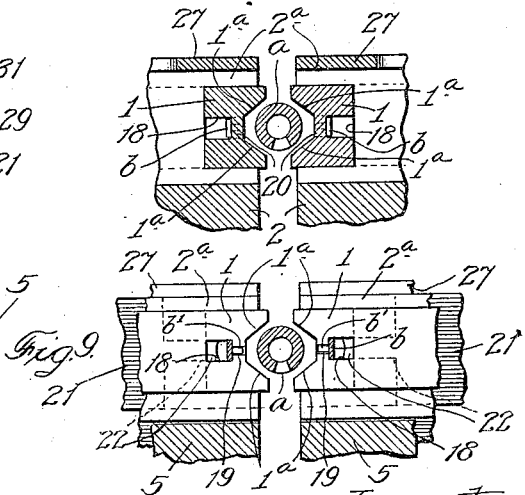

S. H. FLEMING & O. A. LANGOS.
MACHINE FOR APPLYING STAYS TO SOFT METAL TUBES.
APPLICATION FILED FEB. 6, 1912.
1,051,095.
Patented Jan. 21, 1913.
5 SHEETS—SHEET 5.
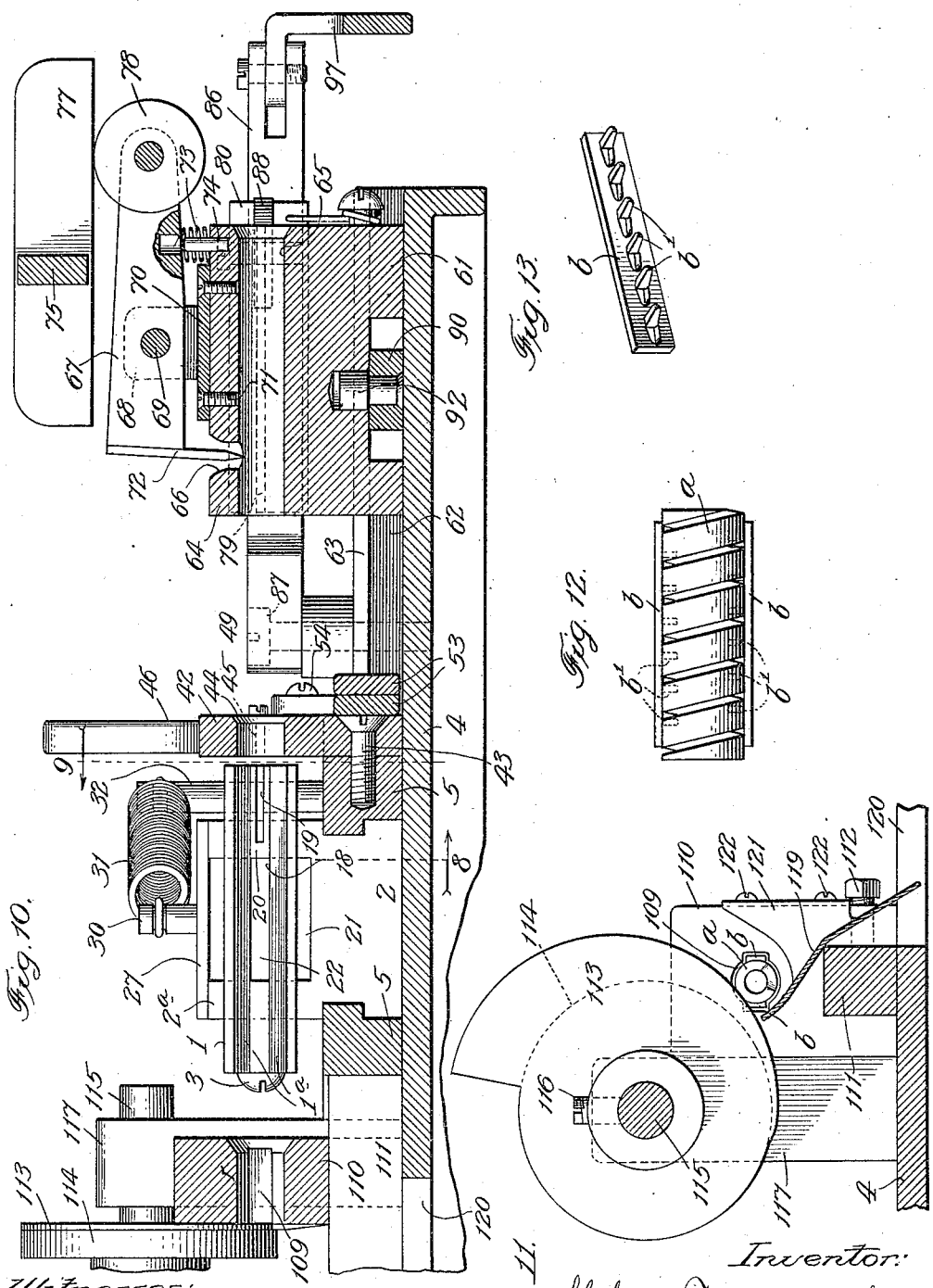

UNITED STATES PATENT OFFICE.

STEPHEN H. FLEMING AND OTTO A. LANGOS, OF CHICAGO, ILLINOIS, ASSIGNORS, BY DIRECT AND MESNE ASSIGNMENTS, TO LUTHER L. MILLER, TRUSTEE, OF CHICAGO, ILLINOIS.

MACHINE FOR APPLYING STAYS TO SOFT-METAL TUBES.

1,051,095.   Specification of Letters Patent.   Patented Jan. 21, 1913.

Application filed February 6, 1912. Serial No. 675,843.

*To all whom it may concern:*

Be it known that we, STEPHEN H. FLEMING and OTTO A. LANGOS, citizens of the United States, and residents of Chicago, county of Cook, and State of Illinois, have invented certain new and useful Improvements in Machines for Applying Stays to Soft-Metal Tubes, of which the following is a full, clear, and exact description.

The invention relates to machines for applying stays to soft metal tubes and more particularly to machines for assembling the soft metal sleeves and stays of screw anchors, such as set forth in United States Letters Patent No. 1,005,630, granted to Stephen H. Fleming on October 10, 1911.

The invention consists in the features of improvement hereinafter set forth, illustrated in the preferred form in the accompanying drawings and more particularly pointed out in the appended claims.

Figure 1:
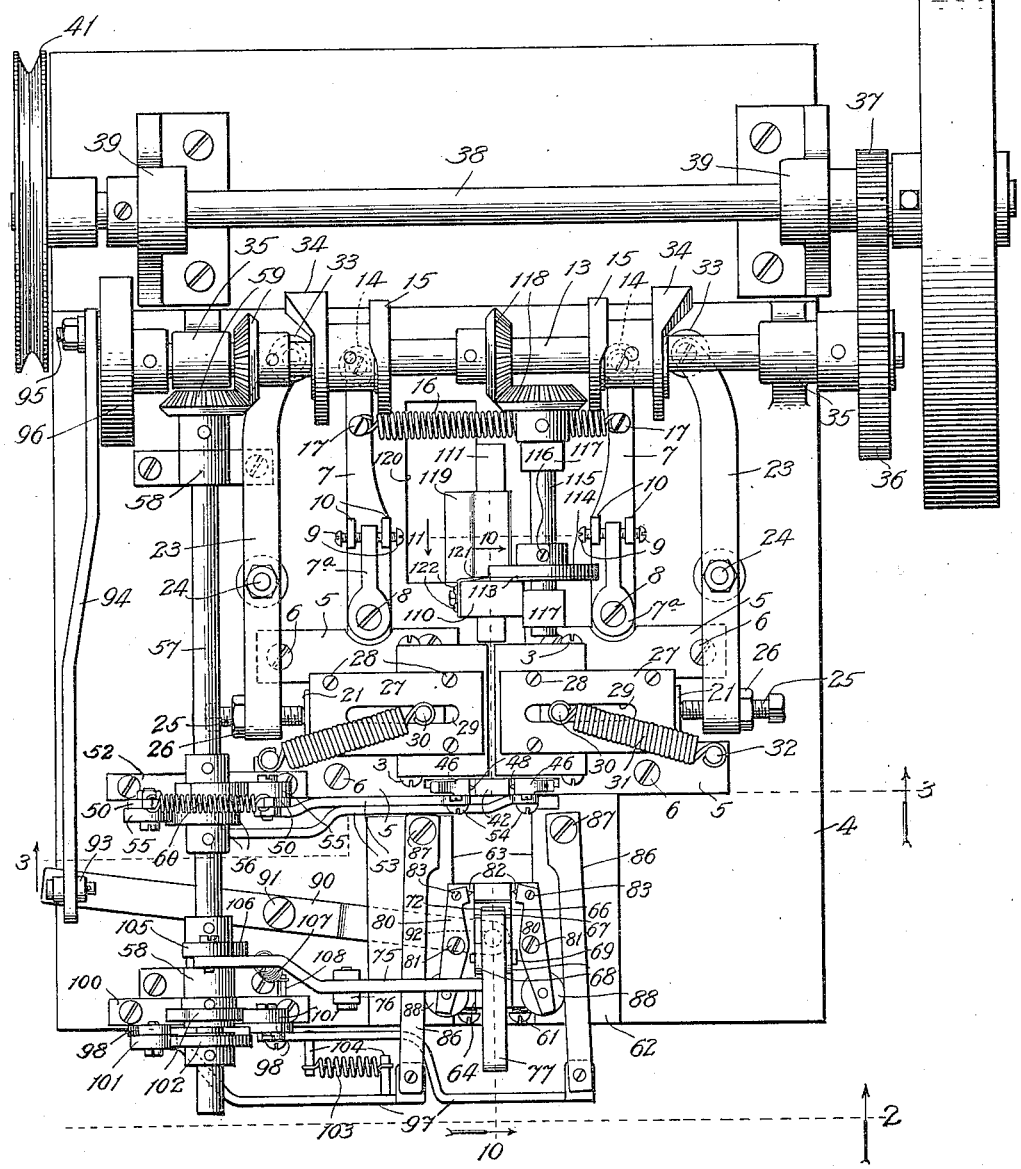
Figure 5:
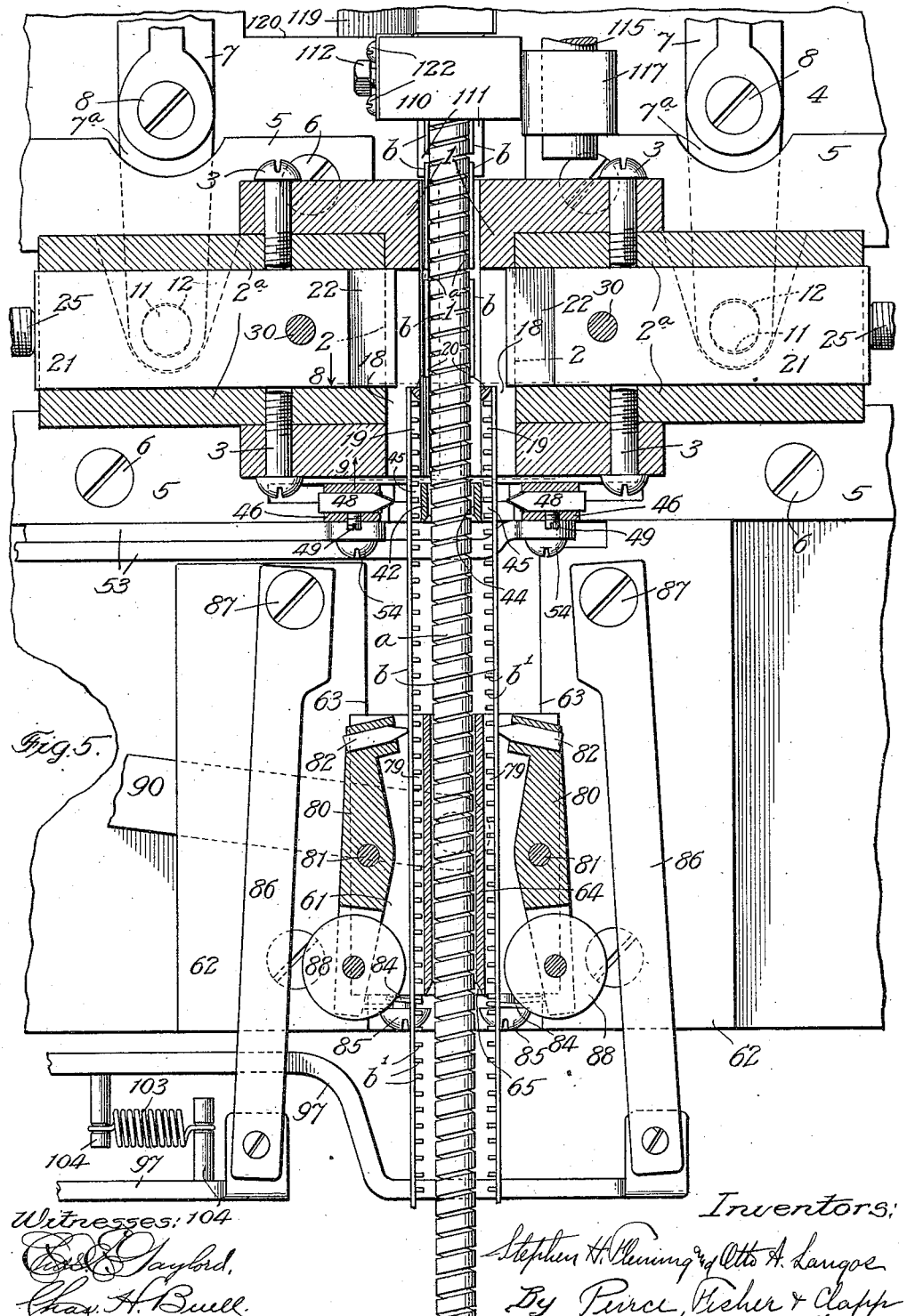

In the drawings, Figure 1 is a plan view of the improved machine. Fig. 2 is an end view looking in the direction of the arrow 2 of Fig. 1. Figs. $2^a$, $2^b$ and $2^c$ are detail views of certain cams used in the machine. Fig. 3 is a cross section on line 3—3 of Fig. 1. Fig. 4 is a detail section on the line 4 of Fig. 3. Fig. 5 is a partial horizontal section on the line 5 of Fig. 3, the parts being shown on an enlarged scale. Fig. 6 is a partial plan section similar to Fig. 5 with the parts shown in a different position. Fig. 7 is a detail cross section on line 7 of Fig. 6. Figs. 8 and 9 are detail cross sections on the lines 8 and 9, respectively, of Fig. 5. Fig. 10 is a longitudinal section on the line 10—10 of Fig. 1, with the parts shown on an enlarged scale. Fig. 11 is an enlarged detail cross section on the line 11 of Fig. 1. Fig. 12 is an enlarged view of a screw anchor which is assembled by the machine. Fig. 13 is a perspective view of one of the stays which were applied to the soft metal tube or sleeve of the screw anchor.

The screw anchor set forth in United States Letters Patent No. 1,005,630, above referred to, and which is assembled by the present improved machine, comprises a cylinder or sleeve $a$ of lead or like soft metal, which is preferably formed of a coiled, soft metal strip, as indicated in Fig. 12. The soft metal sleeve is provided with strengthening stays $b$ of brass or the like, and in the form shown, two of these stays are applied to opposite sides of the sleeve. The stays are provided with teeth $b'$ which are struck up from the body of the stay, as indicated in Fig. 13, and the stays are applied to the sleeve or tube $a$ by forcing the teeth into the soft metal body thereof, as indicated in Fig. 12.

The present improved machine comprises a presser device for applying the stays to the tube by forcing the teeth of the stay into the tube, together with means for feeding the tubes and stays to the presser device and means for guiding or holding the tubes and stays in parallel relation as they are operated upon by the presser device. Preferably, the machine is arranged to receive the soft metal tube in a continuous length and the stays in continuous strips and means are provided for severing the tubes and stays into sections to form the separate screw anchors.

The clamping means for centering and holding the soft metal tube $a$ as the stays are applied thereto comprises a pair of jaws 1 which are relatively movable together and apart. In the form shown, both jaws reciprocate and for this purpose are mounted upon the inner ends of a pair of slides 2. The jaws shown are U-shaped (see Fig. 5), fit over the inner ends of the slides 2 and are secured thereto by screws 3. The inner, longitudinally extending portions of the jaws 1 fit within recesses formed in the upstanding side portions $2^a$ of the slide 2 (see Figs. 7, 8, 9 and 10) and these inner portions of the jaws are provided with beveled faces $1^a$ which are arranged to engage and center the tube $a$. The slides 2 and jaws 1 thereon reciprocate to and from each other to engage and disengage the tube $a$ in a transverse direction over the base plate 4 of the machine. Pairs of L-shaped guides 5 are secured to the base plate 4 by screws 6 and engage the lower portions of the slides 2 and the inwardly offset portions of the guides engage grooves formed in the side faces of the slides, as most clearly shown in Fig. 10.

The slides 2 and jaws 1 thereon are reciprocated by a pair of operating levers 7 which are pivotally connected to the base plate 4 by screws 8 (see Figs. 1, 5 and 6). These levers are preferably formed of outer and inner sections 7 and 7ª, both of the sections of each lever being pivoted upon one of the screws 8. The outer end of the inner section 7ª is connected to the outer section 7 by a pair of adjusting screws 9 threaded through lugs 10 on the outer section into engagement with the outer end of the inner lever sections 7ª. The inner lever sections 7ª extend through openings formed in the guides 5 and slides 2 and are pivotally connected to the slides by pins 11 extending through openings 12 in the levers which are slightly elongated, as indicated in Fig. 5. The outer ends of the levers (see Fig. 1) extend beneath a main operating shaft 13 and are provided with rollers 14 which are arranged to engage cams 15 on the shaft 13. A coiled spring 16 extends between pins 17 on the outer ends of the lever sections 7 and hold the rollers 14 in engagement with the cams 15. They also hold the slides 2 and jaws 1 thereon in the open position shown in Figs. 8 and 9, when the rollers 14 engage the low portions of the cams 15. When the high portions of the cams engage the rollers, the levers are shifted against the tension of the spring 16 and the slides 2 and jaws 1 are moved inwardly to engage and position the tube $a$, as shown in Fig. 7. By means of the screws 9 the position of the slides and jaws thereon can be adjusted with reference to the operating means.

Each of the jaws 1 (see Figs. 5, 6, 8, 9 and 10) is provided between the beveled faces 1ª thereof, with transverse guide-ways 18 which extend parallel to the beveled faces 1ª which are arranged in the horizontal central portion of the jaws. These guide-ways are adapted to receive the stays $b$; and slots 19, which extend between the guide-ways and the inner faces of the jaws, are adapted to receive the teeth $b'$ of the stay strips. At one portion the slots 19 are closed by portions 20 which are formed in piece with the jaws and which extend across the slots 19. The faces of these portions 20 with which the teeth $b'$ come in contact, are beveled, as most clearly indicated in Figs. 5 and 6.

The presser devices for forcing the stays into the tube comprise a pair of plungers 21 mounted upon the slides 2 and which are arranged to reciprocate thereon between their side portions 2ª. The plungers 21 are provided with inner reduced working ends 22 which are adapted to be projected transversely into the inner portions of the guide-ways 18 to force the stay strips $b$ into the soft metal tube $a$. Preferably, also, the presser devices or plungers 22 coöperate with the portions 20 to sever the stay strips into sections. That is to say, these parts are hardened and are provided with coöperating cutting edges, so that, as the plungers 22 are advanced to press the stay strips into the tube, the strips are forced against the cutting edges of the portions 20 and severed, as indicated in Fig. 6. The parts are so arranged that the plungers engage the teeth $b'$, to some extent, with the soft metal tube $a$ before cutting off the inner portions of the stays. In this way, the stays are so held in position that they are properly attached to the tube. The inner working faces of the plungers 22 are preferably slightly concaved, as indicated in Fig. 7.

The plungers 21 having the working portions 22 thereon, are shifted by a pair of levers 23 (see Fig. 1) which are connected to the base plate by pivot bolts 24. Screws 25 adjustably threaded through the inner ends of the levers, are arranged to engage the outer ends of the sliding plungers 21 and are held in adjusted position by nuts 26. The plungers 21 are held in place upon the slides 2 by cover plates 27 which extend between the side portions 2ª of the slides and which are secured to these side portions by screws 28. These cover plates are provided with slots 29 and pins 30 on the plungers 21 extend upwardly through the slots. Springs 31 extend between these pins and a pair of pins 32 fixed to the outer ends of the two of the guides 5. These springs tend to retract the plungers and hold them in engagement with the screws 25 on the operating levers 23. The springs also serve to hold rollers 33 on the outer ends of the levers in engagement with a pair of operating cams 34 on the drive shaft 13. When the rollers 33 engage the low portions of the cams 34, the plungers 21 and working portions 22 thereof are retracted, as shown in Fig. 5. When the high portions of the cams engage the rollers, the plungers are advanced to cut off sections of the stay strips and press them into the soft metal tube, as indicated in Figs. 6 and 7.

The main drive shaft 13 is journaled in suitable bearings 35 on the bed plate and is provided at one end with a gear 36 which meshes with a pinion 37 on a counter-shaft 38. The counter-shaft is journaled in suitable bearings 39 on the bed plate and is provided on one end with a fly-wheel 40 and at its opposite end with a grooved pulley 41 by which it may be driven from a motor or other suitable source of power. If desired, the counter-shaft 38 may be turned by hand.

The soft metal tube $a$ is directed into position between the clamping jaws 1 by a guide block 42 (see Figs. 3, 5 and 10), the lower end of which is arranged in a recess in one of the guides 5 and is secured thereto by a screw 43. The block extends upwardly from the guide 5 and is provided at its upper end with an opening 44, the axis of which lies in the central horizontal plane of the clamping jaws 1 and through which the tube $a$ is guided into position to be engaged by the jaws. This block is provided with guide grooves 45 (see Fig. 3) for the teeth $b'$ of the stay strips and, when the latter are acted upon by the working plungers 22, the stay strips are gripped between the side edges of the block 42 and a pair of clamping devices. These clamping devices comprise a pair of arms 46, the lower ends of which are arranged within recesses in the horizontal guide 5 and are pivotally connected thereto by pins or screw bolts 47, as shown most clearly in Fig. 4. Each of the arms is provided with a sharpened prong or tooth 48 which is set within a transverse opening therein and held in place by a set screw 49. When the clamp arms 46 are shifted inwardly toward each other, the prongs or teeth 48 engage the stay strips $b$, as indicated in Fig. 6, and hold the strips in position while they are acted upon by the working plungers 22.

The clamp arms 46 are shifted by a pair of levers 50 (see Fig. 3) which are pivotally connected adjacent their lower ends by screws 51 to a block 52 on the bed plate 4. The lower ends of these arms are connected to the outer ends of a pair of links 53. The inner ends of these links are upturned and connected by pivot screws 54 to the clamp arms 46. The operating arms or levers 50 for the clamp arms are provided with rollers 55 which are arranged to engage cams 56 upon a longitudinally extending shaft 57. This shaft is journaled in suitable bearings 58 (see Fig. 1) upon the bed plate and its rear end is connected to the drive shaft 13 by a pair of beveled gears 59. A spring 60 extends between the upper ends of the levers 50 and holds the rollers 55 in engagement with the cams 56. When the rollers engage the low portions of the cams, the clamp arms 46 are forced inwardly by the spring 60 to bring the gripping teeth 48 thereon into engagement with the stay strips $b$, as indicated in Figs. 3 and 6, and when the high parts of the cams 56 engage the rollers, the clamp arms 46 are moved and the gripping teeth or prongs are shifted out of engagement with the stay strips, as indicated in Fig. 5, to permit the feeding movement thereof. The upper ends of the arms are extended to form finger pieces, so that they may be readily separated to permit the insertion of the stay strips $b$ in starting the operation of the machine.

Intermittently acting feed mechanism is provided for advancing the tube $a$ and the stay strips $b$ to the clamping and presser devices. This feed mechanism comprises a reciprocating feeder or slide 61 (see Figs. 1, 2, 5 and 10). The feeding slide 61 is arranged to reciprocate between a pair of guides 62 which are provided with lips 63 (see Fig. 2) engaging grooves in the side faces of the slide 61. The feeding slide is provided with an upwardly projecting portion 64 having a longitudinally extending opening 65 therein through which the soft metal tube $a$ extends. A transverse slot 66 extends from the upper face of the portion 64 of the feeding slide and communicates with the inner portion of the longitudinal opening or bore 65, as shown in Fig. 10. A gripping device is arranged to project through the opening 66 into engagement with the tube $a$ to engage and advance the tube as the feeding slide is advanced. This gripping device comprises an arm 67 which is pivotally mounted between a pair of ears 68 upon a cross pin 69. The ears 68 are formed upon a clip 70 which is secured to the upper face of the portion 64 of the feeding slide by screws 71.

The inner end of the arm 67 is provided with a gripping prong 72, and the opposite end of the arm is arranged to be engaged by a spring 73 which is coiled about a pin 74 on the upper outer end portion of the part 64. The spring tends to shift the arm and project the gripping prong 72 through the opening 66 into engagement with the metal tube $a$. The tube is thus gripped during the forward movement of the feeding slide 61. Upon the backward movement of the feeding slide the gripping device 67 is released by a shifter arm 75 which is pivotally mounted upon an upright 76 on the bed plate (see Fig. 2) and which is provided at its inner end with a cross arm 77 which is adapted to engage a roller 78 on the outer end of the gripping arm 67, as indicated in Fig. 10.

The upper projecting portion 64 of the feeding slide 61 is provided with grooves 79 (see Fig. 2) for receiving the tooth $b'$ of the stay strips $b$. The stay strips are clamped against the side faces of the portions 64 by a pair of gripping devices which comprise arms 80 connected to the base portion of the slide 61 by vertical pivot pins 81. The inner ends of these arms are provided with gripping teeth or prongs 82 held in place by set screws 83 (see Fig. 1) and the outer ends of the arms are arranged to be engaged by a pair of springs 84 which are coiled about a pair of screw bolts 85 fixed to the outer end of the slide 61, as shown in Fig. 2. These springs hold the gripping devices in engagement with the stays during the forward movement of the feeding slide. During the backward movement of the slide, the gripping devices 80 are released by a pair of shifters 86 which are pivotally connected at their inner ends to the guides 62 by screws 87 and which are arranged to engage a pair of rollers 88 on the outer end of the gripping arm.

The feeding slide 61 is reciprocated by a lever 90 (see Fig. 1) which is connected between its ends to the base plate by a pivot bolt 91. The inner end of the lever extends into a recess in the feeding slide 61 and is connected thereto by a pin 92 (see Fig. 10). The outer end of the lever has an upwardly projecting lug 93 which is pivoted to one end of a pitman rod or link 94. The opposite end of the link engages the crank pin 95 of a disk 96 which is fixed to the end of the main operating shaft 13.

The releasing shifters 86 are connected at their forward ends to the upturned ends of a pair of links 97 (see Figs. 1 and 2). The outer ends of these links are connected to the lower ends of a pair of arms 98 which are pivotally connected by screws 99 to an upright 100 on the base plate. The upper ends of these arms are provided with rollers 101 that are arranged to engage a pair of cams 102 on the forward end of the shaft 57. A spring 103 extends between a pair of pins 104 on the links 97 and holds the rollers 101 in engagement with the cams 102. The releasing shift lever 75 is provided on its outer end with a roller 105 which engages a cam 106 on the shaft 57. A spring 107 extends between the outer end of the arm or lever 75 and a fixed pin 108 (see Fig. 1) and holds the roller 105 into engagement with the cam 106.

On the forward movement of the feeding slide 61, the rollers on the arms 98 and 75 engage the low portions of the cams 102 and 106, respectively, and the releasing shifters are held by the springs 103 and 107 out of engagement with the rollers on the gripping devices 67 and 80. Thus, during the forward movement of the feeding slide 61, the gripping devices 67 and 80 are in engagement with the tube $a$ and stay strips $b$ to advance the same. At this time the jaws 1 and clamp arms 46 are retracted so that the tube and stay strips can be advanced between the jaws and between the inner ends of the presser devices or plungers 22. On the backward movement of the feeding slide, the rollers of the arms 98 and 75 are in engagement with the high portions of the cams 102 and 106 so that the gripping devices 67 and 80 are held disengaged from the tube $a$ and stay strips $b$. During this backward shift of the feeding slide, the clamp jaws 1 and gripping devices 46 engage the tube and stay strips and hold them in position to be operated upon by the plungers 22. By this arrangement, there is no danger that the tube and stay strips will be drawn backward by the return shift of the feeding slide 61. The cams 102 are preferably so arranged that the gripping devices 80 are disengaged from the stay strips before the feeding slide completes its forward movement and before the cam 106 operates the releasing shifter 75 for the gripping device 67. In this way, the tube $a$ is advanced at each operation somewhat farther than the stay strips $b$. By reason of this arrangement, the sections which are severed from the stay strips and applied to the tube are spaced apart, as indicated in Figs. 5 and 6. As the tube $a$ with the sections of the stay strips applied thereto, moves beyond the jaws 1, it passes through an opening 109 in a block 110 (see Figs. 1, 6 and 11). This guide block fits upon a longitudinal rib 111 on the bed plate 4 and is adustably connected thereto by a set screw 112. A rotary knife 113 is arranged in engagement with the rear face of the block 110, for severing the tube $a$ into sections. This knife is mounted upon a disk 114 which is adjustably fixed to a short longitudinally extending shaft 115 by a set screw 116. This shaft is journaled in suitable bearings 117 on the bed plate and its rear end is connected by a pair of beveled gears 118 to the main drive shaft 13. The knife is provided with a spiral edge so as to operate with a shear cut. In operation the knife and the block 110 which coöperates therewith, are adjusted so that the knife will sever the tube $a$ at points between the sections of the stay strips $b$, as indicated in Fig. 6. The completed screw anchors, as they are cut off by the knife 113 fall upon an inclined chute 119 (see Figs. 1 and 11) and are directed thereby to an opening 120 in the base plate. The chute 119 is preferably formed of sheet metal and is provided with a bent, offset portion 121 which is secured to the block 110 by screws 122.

The shafts 13, 57 and 115 are geared together to rotate at the same speed and one operation is completed during each revolution of these shafts.

In operating the machine, the tube $a$ and the stay strips $b$ are placed in position. The forward movement of the feeding slide 61 advances the soft metal tube and the stay strips, as described, and advances the tube slightly farther than the stay strips. During this forward movement of the feeding slide, the jaws 1, the presser devices or plungers 22 and the clamp arms 46 are in retracted position, as shown in Fig. 5. As the feeding slide approaches the end of its forward movement, the gripping devices 80 for the stay strips are first released by the shifters 86 and then the gripping device 67 for the feed tube is released by the shifter 75. In this way, the tube $a$ is fed forwardly into position between the gripping jaws 1 step by step and the stay strips $b$ are fed forwardly step by step into the guide-ways 18 of the jaws, the tube and stay strips being in parallel relation. The jaws 1 and gripping devices 46 are then advanced to engage and center the tube and hold the stay strips in position during the backward movement of the feeding slide and during the operating movement of the presser devices or plungers 22. The latter are then advanced to sever sections from the stay strips *b* and force them into the soft metal tube *a*, as indicated in Fig. 6. At each operation of the machine, the knife 113 severs a section from the tube *a* to which the stay sections have already been applied and thereby forms a completed screw anchor.

It is obvious that numerous changes may be made without departure from the essentials of the invention as defined in the claims.

We claim as our invention:—

1. In a machine for applying stays to soft metal tubes, the combination of a presser device for applying the stay to the tube, guides for directing the tube and stay in parallel relation to said presser device, and means for feeding the tube and stay in continuous length through said guides.

2. In a machine for applying stays to soft metal tubes, the combination of a presser device for applying the stay to the tube, guides for directing the tubes and stay in parallel relation to said presser device, means for feeding the tube and stay in continuous lengths through said guides, and a cutter for severing the tube into sections.

3. In a machine for applying stays to soft metal tubes, the combination of guiding means for holding the tube and stay in parallel relation, feed mechanism for advancing continuous lengths of the tube and stay strips through said guiding means, and a presser device for severing the stay strip into sections and applying the latter to the tube.

4. In a machine for applying stays to soft metal tubes, the combination of a presser device for applying the stay to the tube, clamping means for holding the tube and stay in parallel relation and in position to be operated upon by said presser device, intermittently acting feed mechanism for advancing continuous lengths of the tube and stay to said clamping means, and means for successively operating said feed mechanism, said clamping means and said presser device.

5. In a machine for applying stays to soft metal tubes, the combination of a presser device for applying the stay to the tube, clamping means for holding the tube and stay in parallel relation and in position to be operated upon by said presser device, intermittently acting feed mechanism for advancing continuous lengths of the tube and stay to said clamping means, a cutter for severing the tube into sections and means for operating said feed mechanism, clamping means, presser device and cutter.

6. In a machine for applying stays to soft metal tubes, the combination of intermittently acting feed mechanism for advancing continuous lengths of the tube and stay in parallel relation, clamping means for engaging the tube and stay, a presser device for severing the stay strip into sections and applying the same to the tube, and means for operating said feed mechanism, clamping means and presser device.

7. In a machine for applying stays to soft metal tubes, the combination of clamping means for engaging and holding the tube and stay in parallel relation, feed mechanism for advancing the tube and stay in continuous lengths to said clamping means and a presser device operating through said clamping means for applying the stay to the tube.

8. In a machine for applying stays to soft metal tubes, the combination of clamping means for engaging and centering the tube, guides for directing continuous lengths of the tube and stay to said clamping means, feed mechanism for intermittently advancing the tube and stay strips through said guides, a presser device coöperating with said clamping means for applying the stay to the tube, and a cutter for severing the tube into sections.

9. In a machine for applying stays to soft metal tubes, the combination of relatively movable jaws for engaging the tube, means for feeding the tube and stay in parallel relation through said jaws, and a plunger for pressing the stays into the tube.

10. In a machine for applying stays to soft metal tubes, the combination of relatively movable jaws for engaging and centering the tube, means for feeding and guiding the tube and stay to said jaws in parallel relation, and a plunger operating through one of said jaws for applying the stay to the tube.

11. In a machine for applying stays to soft metal tubes, the combination of relatively movable jaws for engaging and centering the tube, one of said jaws having a guideway for the stay, a plunger operating through said guideway for applying the stay to the tube, and mechanism for feeding the tubes and stays through said jaws and guideway.

12. In a machine for applying stays to soft metal tubes, the combination of relatively movable jaws for engaging and centering the tube, one of said jaws having a guideway for the stay, a plunger operating through said guideway for applying the stay to the tube, intermittently acting feed mechanism for advancing continuous lengths of the tube and stay in parallel relation through said jaws and guideway, and means for successively operating said jaws and said plunger.

13. In a machine for applying stays to soft metal tubes, the combination of relatively movable jaws for engaging and centering the tube, one of said jaws having a guideway for the stay, a plunger operating through said guideway for applying the stay to the tube, intermittently acting feed mechanism for advancing continuous lengths of the tube and stay in parallel relation to said jaws and guideway, a cutter for severing the tube into sections, and means for operating said feed mechanism, jaws, plunger and cutter.

14. In a machine for applying stays to soft metal tubes, the combination of relatively movable jaws for engaging and centering the tube, feed mechanism for advancing the tube and stay strips through said jaws, and a plunger coöperating with said jaws for severing the stay strips into sections and applying the same to the tube.

15. In a machine for applying stays to soft metal tubes, the combination of relatively movable jaws for engaging and centering the tubes, one of said jaws having a guideway for the stay, intermittently acting feed mechanism for advancing the tube and stay strip through said jaws and said guideway, a reciprocating plunger operating through said guideway for severing the stay strip into sections and applying the same to the tube, a cutter for severing the tube into sections, and means for operating said jaws, plunger, feed mechanism and cutter.

16. In a machine for applying stays to soft metal tubes, the combination of relatively movable jaws for engaging and centering the tube, one of said jaws having a guideway for the stay strip, a clamp for engaging the stay strip and holding the same in said guideway, intermittently acting feed mechanism for advancing the tube and stay strip through said jaws and guideway, and a presser device operating through one of said jaws for applying the stay to the tube.

17. In a machine for applying stay strips to soft metal tubes, the combination of a pair of opposed reciprocating jaws for engaging and centering the tube, said jaws having guideways for the stay strips, clamps for engaging and holding the stay strips, intermittently acting feed mechanism for advancing the tube to said jaws and for advancing the stay strips to said clamps and guideways, and plungers reciprocating through said jaws for applying the stays to the tube.

18. In a machine for applying stay strips to soft metal tubes, the combination of a pair of opposed reciprocating jaws for engaging and centering the tube, said jaws having guideways for the stay strips, clamps for engaging and holding the stay strips, intermittently acting feed mechanism for advancing the tube to said jaws and for advancing the stay strips to said clamps and guideways, plungers operating through said jaws and the guideways thereof for severing the stay strips into sections and applying the same to the tube, a cutter for severing the tube into sections, and means for operating said parts in order.

19. In a machine for applying stays to soft metal tubes, the combination of a presser device for applying the stay to the tube, clamping means for holding the stay and tube in parallel relation and in position to be operated upon by said presser device, a reciprocating feeder for advancing the tube and stay in continuous lengths to said clamping means, gripping devices on said feeder for engaging the tube and stay and means for throwing said gripping devices into and out of operation as said feeder is reciprocated.

20. In a machine for applying stays to soft metal tubes, the combination of clamping means for holding the tube and stay in parallel relation, a presser device operating through said clamping means for applying the stay to the tube, a reciprocating feeder for advancing the tube and stay in continuous lengths to said clamping means, pivoted, spring-held grippers on said reciprocating feeder for engaging the tube and stay, and shifters arranged to release said grippers upon the backward movement of said feeder.

21. In a machine for applying stay strips to soft metal tubes, the combination of clamping means for holding the tube and stay strip in parallel relation, a plunger for severing the stay strip into sections and applying the same to the tube, intermittently acting feed mechanism for the tube and stay strip arranged to advance the tube farther than the strip, and a cutter for severing the tube into sections.

22. In a machine for applying stay strips to soft metal tubes, the combination of clamping means for holding the tube and stay strip in parallel relation, a plunger for severing the stay strip into sections and applying the same to the tube, a reciprocating feeder, grippers thereon for engaging the tube and stay strip, and means for successively releasing the stay engaging gripper and the tube engaging gripper whereby the tube is advanced farther than the stay, and a cutter for severing the tube into sections.

23. In a machine for applying stays to soft metal tubes, the combination of opposed reciprocating jaws for engaging and centering the tube, said jaws having guideways for the stay strip, plungers operating longitudinally through said jaws and transversely through said guideways for applying the stays to the tube, a reciprocating feeder, gripping devices on said feeder for engaging the tube and stay strips, and shifters for releasing said gripping devices upon the backward movement of said feeder.

24. In a machine for applying stays to soft metal tubes, the combination of a pair of opposed reciprocating jaws for engaging and centering the tube, said jaws having guideways for the stay strips, plungers reciprocating longitudinally through said jaws and transversely through said grooves for severing the stay strips into sections and applying the same to the tube, guides for directing the tube and stay strip to said jaws in parallel relation, a reciprocating feeder for advancing the tube and stay strips through said guides, gripping devices on said reciprocating feeder for engaging the tube and stay strips upon the forward movement of the feeder, and shifters arranged to engage said gripping devices and release the same upon the backward movement of the feeder.

25. In a machine for applying stays to soft metal tubes, the combination of means for applying a stay to the tube; and means for holding the stay to the tube in position to be operated upon by said applying means.

26. In a machine for applying stays to soft metal tubes, the combination of a device for applying the stay to the tube; means for holding the stay and the tube in parallel relation and in position to be operated upon by said device; and a cutter for severing the tube into sections.

27. In a machine of the character described, the combination of means for applying stays to tubes and for severing the stay strips into sections; and means for holding the stays and the tubes in parallel relation and in position to be operated upon by said applying means.

STEPHEN H. FLEMING.
OTTO A. LANGOS.

Witnesses:
ELEANOR HAGENON,
KATHARINE GERLACH.

Copies of this patent may be obtained for five cents each, by addressing the "Commissioner of Patents, Washington, D. C."